Figure 5:
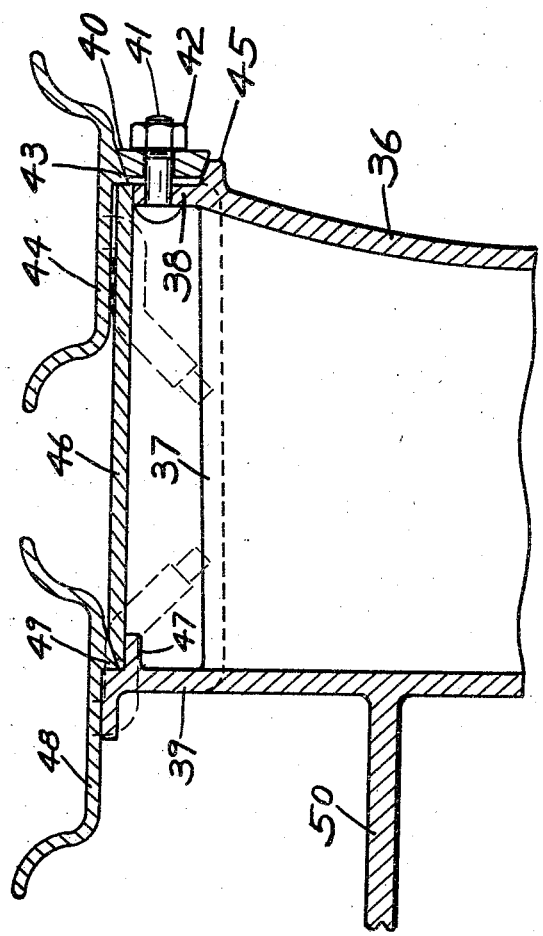

Oct. 25, 1932.  G. WALTHER  1,884,936
METAL WHEEL
Filed Aug. 5, 1929    2 Sheets-Sheet 1
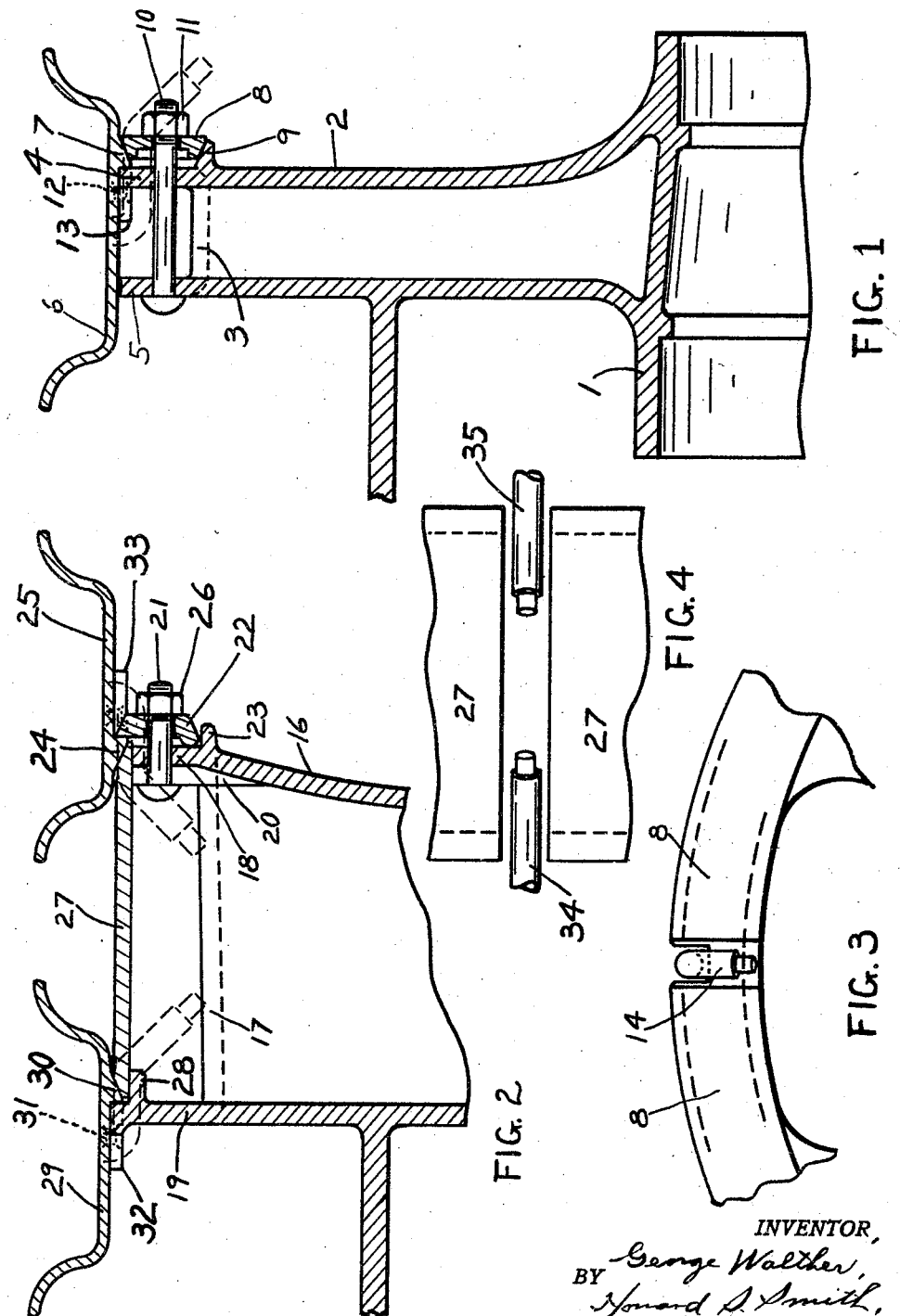

Oct. 25, 1932.    G. WALTHER    1,884,936
METAL WHEEL
Filed Aug. 5, 1929    2 Sheets-Sheet 2

INVENTOR,
BY George Walther,
Howard S. Smith
ATTORNEY

Patented Oct. 25, 1932

1,884,936

UNITED STATES PATENT OFFICE

GEORGE WALTHER, OF MONTGOMERY COUNTY, NEAR DAYTON, OHIO, ASSIGNOR TO THE DAYTON STEEL FOUNDRY COMPANY, OF DAYTON, OHIO, A CORPORATION OF OHIO

METAL WHEEL

Application filed August 5, 1929. Serial No. 383,646.

This invention relates to new and useful improvements in metal wheels.

It is the principal object of this invention to provide means on a single or dual metal wheel for easily effecting a positive alinement of the tire rim or rims with the felloe.

In the single wheel the above result is obtained by wedge means which force a shoulder on the rim into engagement with the outboard flange portion of the felloe. The positive rim alinement in the dual wheel is achieved through the engagement of a shoulder on the outboard rim with a beveled spacer, due to the tightening of the wedge means, which also act through that spacer upon the inboard rim to positively aline it with the inboard flange portion of the felloe.

Other important and incidental objects will be brought out in the following specification and particularly set forth in the subjoined claim.

In the accompanying drawings illustrating my invention, Figure 1 is a radial sectional view taken through the hub and a spoke of a single wheel, showing my rim and felloe alining means applied thereto. Figure 2 is a radial sectional view taken through a dual wheel, showing how my rim alining means operate in conjunction with a spacer. Figure 3 is a side view of the split wedge ring, showing the tire valve emerging between its free ends from a slot in the felloe. Figure 4 is a plan view of the radially inner portion of the split spacer band, showing the emergence of the inboard and outboard tire valves from between its free ends. And Figure 5 is a radial sectional view taken through a dual wheel, showing the outboard tire rim wedged against a spacer band having its outboard side edge in a plane at right angles to the axis of the wheel. While I have illustrated in the drawings a spoke wheel, my invention may be applied to any other type of wheel.

Referring to the accompanying drawings for a detailed description of my invention, the numeral 1 designates the hub, 2 a spoke, and 3 the felloe of a single metal wheel. The felloe is formed at its outboard side with a flange 4, and at its inboard side with a flange 5, each in a plane at right angles to the axis of the wheel.

The numeral 6 designates a tire rim formed at its outboard edge with a tapering or beveled rib 7. This rib has a laterally inwardly facing plane surface disposed at right angles to the axis of the wheel for engagement with the flange 4 of the felloe when forced against it by the following wedge means.

Referring to Figure 1, the numeral 8 designates a U-shaped split wedge ring which is tapered at its periphery for engagement with the beveled rib 7 on the tire rim. It also has a tapered surface for engagement with the tapered surface of a boss 9 on the spokes 2.

Passing through holes in the wedge ring 8 from oppositely disposed holes in the flange portions 4 and 5 of the felloe, are bolts 10. To the outer threaded ends of the latter there are applied nuts 11 which, when tightened, will press the wedge ring 8 against the tapered rib 7 on the tire rim 6 to force that rib solidly against the side of the outboard flange portion 4 of the felloe to effect a positive alinement between the latter and the tire rim at all times and under all conditions of use.

To the radially inner surface of the tire rim 6 there is secured, by rivets 12 or other suitable means, a driving block 13. When the tire rim is forced laterally inwardly over the flange portions 4 and 5 of the felloe, this driving block is adapted to enter a groove formed in the flange portion 4 to act as a driving connection between the rim and felloe.

Provided in the felloe portion 4, behind the space between the free ends of the split wedge ring 8, is a slot to receive a tire valve 14 which emerges from said space for convenient access at all times. (See Figures 1 and 3.)

Illustrated in Figure 2 is a dual wheel employing my improved means for effecting a positive alinement between the tire rims and the felloe. In this wheel the numeral 16 designates a spoke and 17 the felloe portion. The latter is formed with an outboard flange portion 18 and a laterally inner flange portion 19 having a laterally outwardly facing plane surface at right angles to the axis of the wheel. The flange portion 18 is formed with an enlargement 20 on its laterally inner side for engagement by the heads of bolts 21 which pass laterally outwardly through holes in said flange portion 18 and registering holes in a split wedge ring 22. Radially inwardly of this wedge ring there is a straight ledge portion 23 formed on the felloe.

The laterally inner straight face of the wedge ring 22 is adapted to engage a tapered rib 24 formed on the radially inward facing surface of the outboard tire rim 25. Applied to the laterally outer threaded ends of the bolts 21 are nuts 26 which are adapted to press the wedge ring 22 laterally inwardly to force the tapered rib 24 of the outboard tire rim 25 against the outboard beveled edge of a split spacer band 27 which rests upon the flange portion 18 of the felloe. The inboard edge of this spacer band, which is also beveled, rests upon a ledge portion 28 projecting laterally outwardly from the flange portion 19 of the felloe. The numeral 29 designates an inboard tire rim having a tapered rib 30 at its outboard edge and on its radially inner facing surface, the said rib having a laterally inwardly facing plane surface disposed at right angles to the axis of the wheel for engagement with the plane surface of the inboard flange 19 to thus position the rim in a plane at right angles to the axis of the wheel. Thus, through the spacer band, the wedge ring 22, when tightened, will positively aline the inboard rim 29 with a plane at right angles to the axis of the wheel.

The inboard tire rim 29 has secured to its radially inwardly facing surface by rivets 31 or other suitable means, a driving block 32 which, when the tire rim is forced laterally inwardly, will enter a slot formed in the flange portion 19 of the felloe 17 to act as a driving connection between the latter and said rim.

After the inboard tire rim 29 is in place on the flange portion 19 of the felloe, the split spacing band 27 is mounted on its supporting portions 18 and 28 of the felloe, whereupon the outboard tire rim 25 is put on, with its tapered rib 24 resting against the laterally outer beveled portion of the spacing band. The outboard rim 25 also has secured to its radially inwardly facing surface a driving block 33 that enters a groove in the wedge ring 22.

As shown in Figure 4, the inboard and outboard tire valves 34 and 35 respectively emerge from the space between the free ends of the split spacer band 27 for convenient access at all times.

In Figure 5 I have shown a dual wheel in which the spacing band has a laterally outwardly facing plane edge disposed at right angles to the axis of the wheel for solid engagement by the rib on the outboard tire rim. In this figure the numeral 36 designates a spoke and 37 the felloe portion. The latter is formed at its laterally outer side with a flange 38 and at its inboard side with a flange 39, each in a plane at right angles to the axis of the wheel.

Passing laterally outward through holes in the flange portion 38 and registering holes in a split wedge ring 40 are bolts 41. To the laterally outer threaded ends of the latter are applied nuts 42 which, when tightened, will press the wedge ring 40 against the beveled face of a tapered rib 43 on the radially inwardly facing surface of the outboard tire rim 44. The wedge ring 40 will also engage the tapered surface of a boss 45 on the spokes 2.

When the wedge ring 40 is tightened it will force the rib 43 on the tire rim 44 solidly against the laterally outer edge of a split spacer band 46 to positively aline the outboard rim with a plane at right angles to the axis of the wheel.

The laterally inner edge of the spacer band 46, which is beveled, rests upon a ledge portion 47 projecting laterally outwardly from the flange portion 39 of the felloe. Formed on the radially inwardly facing surface of the inboard tire rim 48 is a tapered rib 49 adapted to be forced against the flange portion 39 of the felloe through the engagement of the laterally inboard beveled edge of the spacer band with the tapered portion of the rib. Thus, through the spacer band, the wedge ring 40, when tightened, will positively aline the inboard rim 48 with a plane at right angles to the axis of the wheel.

Integral with the laterally inner portions of the spokes 36 is a brake drum 50.

Having described my invention, I claim:

A metal wheel comprising a hub and a hub extension terminating in an outboard flange portion and an inboard flange portion, the inboard flange portion having a laterally outwardly facing plane surface disposed at right angles to the axis of the wheel; an inboard tire rim having a tapered rib at its outboard edge and on its radially inwardly facing surface, the said rib having a laterally inwardly facing plane surface disposed at right angles to the axis of the wheel for engagement with the plane surface of the inboard flange to thus position the rim in a plane at right angles to the axis of the wheel; an outboard tire rim having a tapered rim on its radially inwardly facing surface; a spacer band between said rims and having beveled edges for engagement with the tapered ribs on the tire rims; and clamping means carried by the said outboard flange portion for engagement with the said tapered rib of the outboard rim.

In testimony whereof I have hereunto set my hand this 3rd day of August, 1929.

GEORGE WALTHER.